Patented Sept. 5, 1939

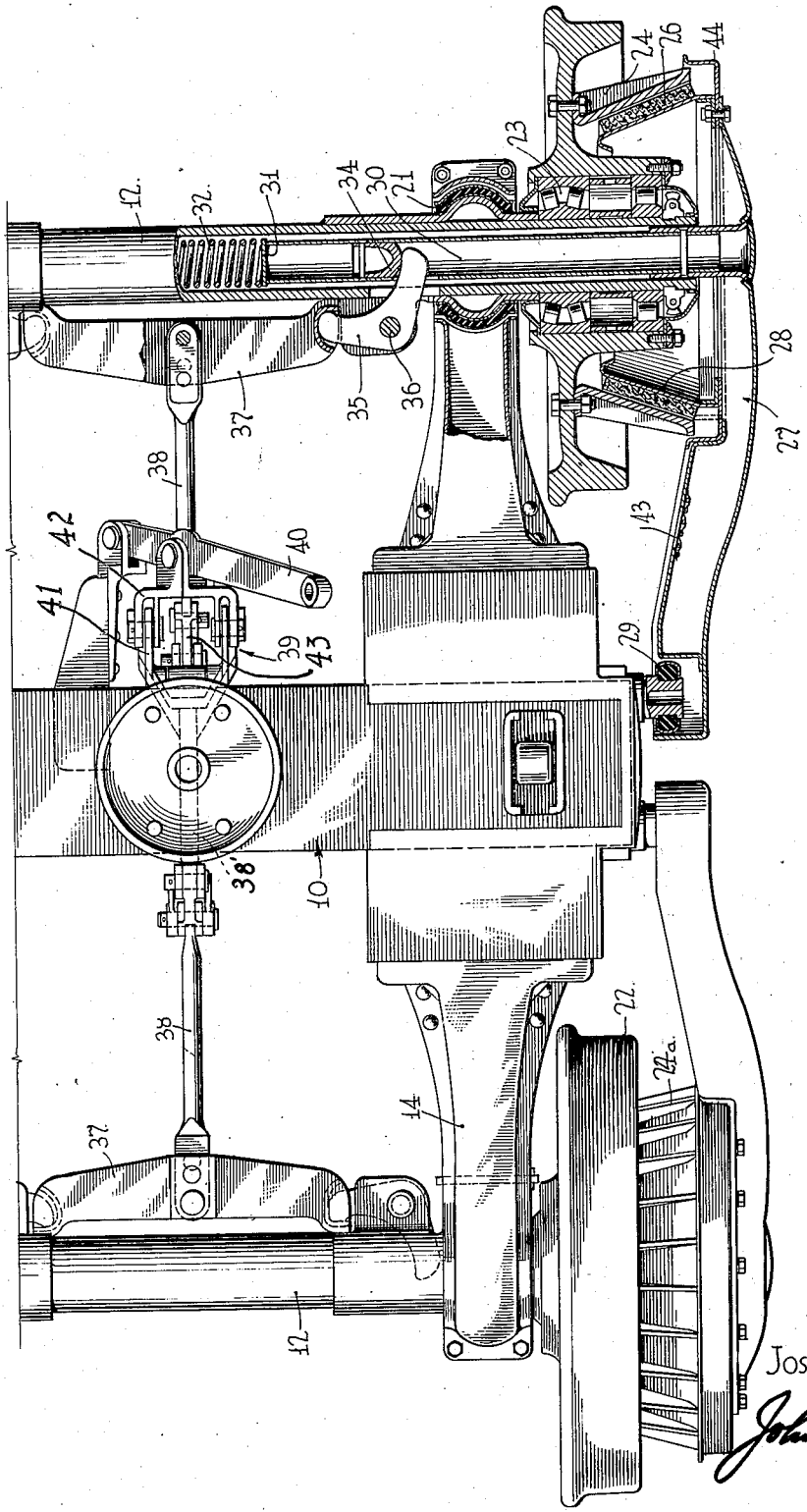

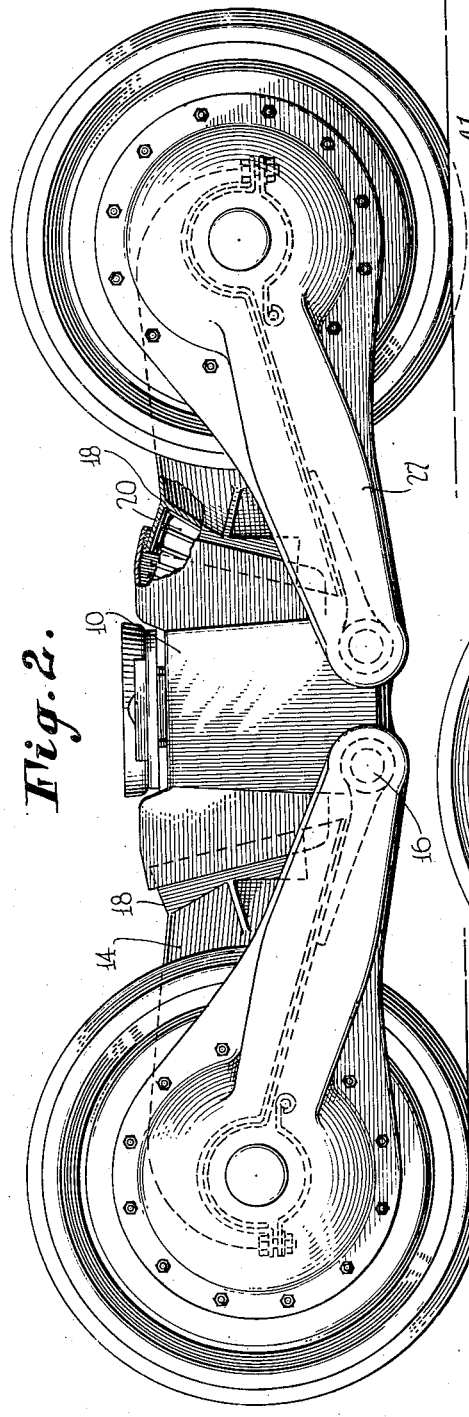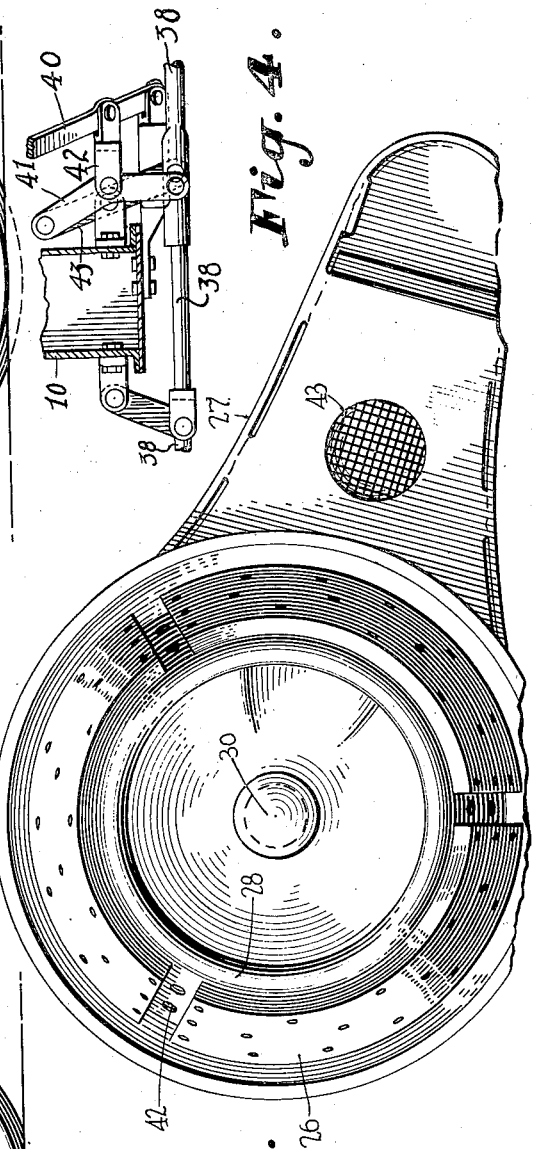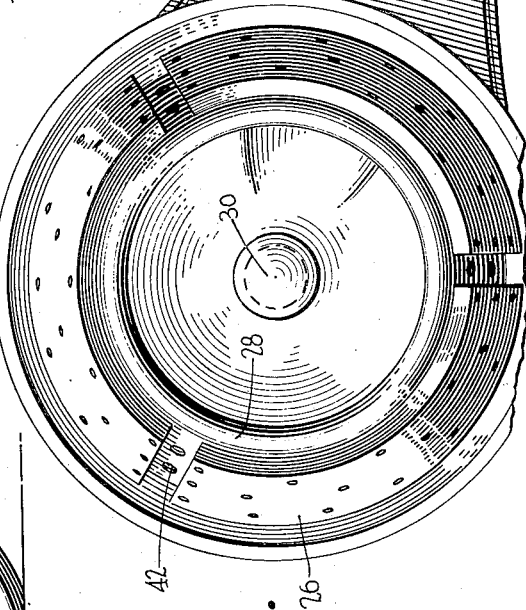

2,172,049

UNITED STATES PATENT OFFICE 2,172,049

VEHICLE BRAKE

Joseph Ledwinka, Philadelphia, Pa., assignor to Budd Wheel Company, Philadelphia, Pa., a corporation of Pennsylvania Application April 7, 1937, Serial No. 135,362

13 Claims. (Cl. 188—59)

This invention relates to improvements in vehicle brakes and more particularly to an axially movable brake for rail car wheels.

One of the principal objects of this invention is to provide a rail car wheel brake including complementary surfaces, one of which is carried by the web of the wheel to eliminate wear on the tread of the wheel and the other surface being axially movable into contact therewith, both braking surfaces being readily removable for replacement or inspection.

A more particular object of this invention is to provide an axially movable brake for a wheel which is journaled on a fixed axle through which an actuating mechanism operates to set up a substantial pressure between the braking surfaces, such brake being especially suited for roller bearing supported rail car wheels.

Another object of the invention is to provide a brake operable on the external webs of the wheels with cone or disk braking surfaces, one of which is preferably lined with a non-metallic lining and with the torque carried by an external member which is partially hollow through which the internal parts of the brake may be readily air cooled.

Further objects and advantages of my invention will appear from the following description of a preferred form of embodiment thereof taken in connection with the attached drawings, in which:

Fig. 1 is a partial plan view of a four wheel rail car truck with parts in section showing the brake shoe actuating mechanism;

Fig. 2 is a side elevation of the truck shown in Fig. 1 with parts broken away to show the suspension means, and Fig. 3 is an interior elevational view of the brake shoe and torque arm.

Fig. 4 is a view in side elevation, parts being shown in section, of the equalizing linkage shown in plan in Figure 1.

The particular type of rail car truck shown to which my invention is especially suited, has a transverse bolster 10 supported from the axles 12 by a plurality of side frame members 14 which are hinged at 16 to the bottom of the bolster. These side frame members have upstanding arms 18 which are resiliently held by abutment against rubber blocks 20 which, in turn, abut the bolster. The bolster, while rigid in a horizontal plane, is free to move in a vertical plane in accordance with the loads thereon, such movement being without rotational effect on the axles 12 as the side frames 14 are carried on rubber blocks 21 as shown in Fig. 1. These rubber blocks permit rotational movement of the arms 14 but prevent any substantial lateral movements thereof.

The wheels 22 are of typical rail car type, except that they are of the free type and are mounted on suitable bearings 23 which are carried by the fixed axles 12. The bearing 23 is of the combined self-centering and thrust type and is mounted in a suitable manner.

Braking surfaces 24 for the wheels 22 operate on the webs, rather than the treads thereof and preferably include a brake member 24 or drum which is of the conical type having external cooling ribs 24a. It will be understood, however, that a disc surface could be provided if desired. This member is bolted to the wheel webs and can be readily assembled. No specially cast wheel sections are required and brake wear is entirely on the removable member so that frequent overhaul of the trucks for wheel repair is unnecessary.

Cooperating with the brake surface 24 is the brake shoe 26 which is of a complementary shape (being either a cone or disc) and it may include a plurality of separate non-metallic shoes as shown in Fig. 3. The shoes are carried by the torque arm 27 through a suitable support 28 which with a cone brake is of an annular conical shape. The torque arm as shown in Fig. 2 has an extended lever arm portion which engages over a hub 29 carried on the bolster 10, such hub being substantially on the axis of rotation of the side frame members 14 with respect to the bolster 10. The hub 29 is preferably of rubber with a metal cap.

The torque arm 27 also includes an actuating post 30 which is hollow and projects into the axles 12 as shown in Fig. 1. The post is provided with a cap 31 which serves as an abutment for a spring 32 which tends to force both of the torque arms on a single axle outward to brake shoe disengaging position. Within this post 30 is provided a hardened steel cam surface 34 which serves as the actuating mechanism by which the brakes are engaged. This cam surface is directly engaged by a bell crank 35 pivoted at 36 on the axles 12 and the bell crank in turn is actuated by an equalizer 37 connected by the link 38 and the equalizing linkage 39 to the brake operating lever 40. It will be understood that the equalizer 37 tends to equalize the brakes on the opposite ends of one axle and the equalizing linkage 39 is of the well known type adapted to equalize the brake pressure between the links 38 connecting the brakes on the respective axles. This mechanism is carried on the bolster 10.

It may comprise a floating lever 41 which is pivoted at its center to a link 42 connecting it to the lever 40. The upper and lower ends of this floating lever 41 are pivoted, respectively, to the upper end of the lever 43 which is pivoted at its mid-point to a bracket on the bolster 10, and to an extension 38' of the link 38 extending to one axle. The link 38 extending to the other axle is pivoted to the lower end of the lever 43. The lever 41 and link 42 are bifurcated receiving between them the lever 43 and its mounting bracket.

The torque arm 27 and the brake shoes 26 are assembled by inserting the post 30 in the hollow axle which centers and supports the brake shoes. The projecting bell crank 35 locks the post in anchoring position as the proportion of the posts is such that the torque arm cannot be withdrawn from the hollow axles 12 except by first removing the bell crank 35 through the removal of its pivot pin.

In order to assure adequate cooling as well as to permit free discharge of foreign obstacles, the brake shoes are spaced a substantial amount and the annular support 28 has apertures 42 for a circulation of air between the braking surfaces. The annular support 28 is also open at the outer end and the torque arm 27 is hollow having a screened opening 43 for circulation of air to the interior of the annular brake support 28. This makes it possible to extend a flange 44 laterally inward to cover the brake surface 24 and prevent foreign obstacles from entering as much as possible. Adequate cooling which is essential on high speed freight and passenger service is thus possible for both the inside and outside of the brake surfaces.

It will be apparent that the braking forces are readily set up regardless of the position of the bolster with respect to the axles and that servicing is readily accomplished and without any material change in the wheel structure. It will also be apparent that the precise shape of the respective braking surfaces need not be precisely as shown, although it is found that the non-metallic brake shoes cooperating with a metallic brake drum of cone shape is most effective at high speeds. The brake shoe has a large working area without exceeding necessary clearance conditions.

While I have shown a preferred form of embodiment of my invention, I am aware that other modifications may be made thereto and I therefore desire a broad interpretation of my invention as described herein and in the claims appended hereinafter.

What I claim is:

1. In combination with a brake surface for a wheel, brake shoes movable into braking position against said brake surface and means to support said brake shoes, said means including a central pivot to maintain substantial concentricity, actuating means connected to said pivot, and an arm to transfer the torque reaction to a remote point, said pivot and arm being integral and externally detachable from the wheel as a unit by simply disengaging said actuating means.

2. In a wheeled vehicle of the class described, a fixed, hollow axle, wheels journaled on said axle, a frame supported by the axle, a brake surface axially on the outboard side of said wheel and of a diameter approaching that of the wheel, a brake surface carried by said axle, means to actuate said axle carried brake surface with respect to said wheel brake surface, and means to take the torque of said axle carried brake surface, both of said means being supported by the frame but freed upon release of the actuating means and being readily removable from the frame as a unit for inspection and repair.

3. In a rail car truck having a plurality of wheels and axles, brake drums carried by said axles and having external cooling ribs, a brake shoe support having brake shoes movable into braking contact against said drum and said support having air cooling openings between the respective shoes and means including a hollow torque arm connected to said brake shoe support to conduct air to the interior of said drum for cooling purposes.

4. In combination with an external brake surface for a rail car wheel, brake shoes movable into braking position against said brake surface and means to support said brake shoes, said means including a torque arm, said torque arm substantially covering said braking surfaces and being substantially hollow in cross section and having an opening for the transfer of air into the interior of said brake.

5. A brake system for a pair of wheels journaled on a hollow axle supporting an internal framework, which comprises a brake surface mounted on each wheel, brake shoes movable into contact with each brake surface, means within said axle to actuate said brake shoes, means to resist brake reactions, said brake reaction resisting means including a covered arm of substantially hollow cross section and having an opening to form an air cooling conduit with the interior of said brake system.

6. A vehicle brake of the class described comprising in combination with a fixed, hollow axle, and wheels journaled thereon, and having a braking surface, a complementary brake surface on the outside of said wheel and actuating means within the axle, whereby the brake surfaces may be engaged, and torque distributing means secured to said complementary brake surface and to an external part of the vehicle, said torque carrying means including a cover extending over the wheel carried brake surface and being hollow and forming air cooling conduits for the interior of the brake surfaces.

7. In combination with an external brake surface for a rail car wheel approaching the diameter of the wheel, brake shoes movable into braking position against said brake surface and means to support said brake shoes, said means including a torque arm having a central pivot to maintain substantial concentricity, said torque arm substantially covering said brake surface and having a connection at a point outside the wheel with which it may be readily engaged or disengaged by simply moving it laterally in the direction of the axis of the wheel.

8. A vehicle brake of the class described comprising in combination with a fixed, hollow axle, and wheels journaled thereon, and each having a braking surface, a complementary brake surface on the outside of each wheel, actuating means within the axle, whereby the brake surfaces may be engaged, and torque carrying means secured to said complementary brake surface and to an external part of the vehicle, said torque carrying means including a cover extending over the wheel carried brake surface, the actuating means within the axle being engaged by a lever mounted on the axle and having one arm extending within the axle, said lever forming the sole connection for securing the complementary brake surface laterally in position.

9. In a truck of the class described having a bolster, an articulated side frame connected to the bolster, axles supporting said framework and wheels journaled on said axles, a brake operating against an external surface of said wheels and a torque arm to resist the braking torque of said brake, said torque arm being secured to the bolster substantially on the same axis as the articulated connection of the side frame to the bolster.

10. In a vehicle having a main frame and an axle supporting said frame through arms pivoted to the frame on transverse pivots, a wheel journaled on said axle, a braking surface on the outer face of said wheel, a brake support carrying a complemental brake surface to coact with said braking surface, a torque arm extending from said brake support and pivoted to the frame substantially in transverse alignment with the pivotal connection of said arms to the frame.

11. A unitary brake structure for use with an external brake surface on a wheel journaled on a hollow axle supporting a vehicle frame, comprising an outer cover for the brake, an annular brake shoe support, a central bearing for supporting the structure on the hollow axle, and a torque arm extending laterally from said cover for connection to the vehicle frame at a remote point, the central bearing carrying means forming part of the sole connection for holding the brake structure laterally in assembled relation with the vehicle frame.

12. In a vehicle having a main frame and a wheel and axle assembly supporting said frame through arms pivoted to the frame on transverse pivots, a braking surface on the outside of a wheel of said assembly and secured to said wheel to rotate therewith, a brake shoe supporting arm pivotally supported at one end thereof concentric with the axle and pivotally supported at its other end on the frame and substantially in alignment with the transverse pivots of said first-named arms, a brake shoe carried by said last-named arm and arranged to coact with said braking surface and means for actuating said shoe.

13. In a vehicle having a main frame and a wheel and axle assembly supporting said frame through arms pivoted to the frame on transverse pivots, a braking surface secured to a wheel of said assembly, a brake supporting arm pivotally supported at one end thereof concentric with the axle and pivotally supported at its other end remote from the axle on the frame and in substantial alignment with the transverse pivots of said first-named arms, a brake shoe carried by said last-named arm and arranged to coact with said braking surface and means for actuating said shoe.

JOSEPH LEDWINKA.